United States Patent [19]

Tacke et al.

[11] 4,244,858

[45] Jan. 13, 1981

[54] FLAMEPROOF POLYAMIDE MOULDING COMPOSITIONS

[75] Inventors: Peter Tacke; Dieter Neuray; Dietrich Michael, all of Krefeld, Fed. Rep. of Germany

[73] Assignee: Bayer Aktiengesellschaft, Leverkusen, Fed. Rep. of Germany

[21] Appl. No.: 18,110

[22] Filed: Mar. 7, 1979

[30] Foreign Application Priority Data

Mar. 10, 1978 [DE] Fed. Rep. of Germany ....... 2810549

[51] Int. Cl.³ .................. C08K 3/32; C08L 77/06; C08K 7/14
[52] U.S. Cl. .................. 260/38; 260/45.7 P; 260/45.7 PH; 260/37 N; 525/2; 525/429
[58] Field of Search ............. 260/38, 45.7 P, 45.7 PH; 525/429

[56] References Cited

U.S. PATENT DOCUMENTS

| | | | |
|---|---|---|---|
| 2,378,667 | 6/1947 | Vaala | 525/429 |
| 3,692,867 | 9/1972 | Mayer et al. | 260/45.7 PH |
| 4,162,275 | 7/1979 | Moulds | 525/429 |

*Primary Examiner*—Wilbert J. Briggs, Sr.
*Attorney, Agent, or Firm*—Connolly and Hutz

[57] ABSTRACT

Self-extinguishing, flameproved, reinforced and/or filled polyamide moulding compositions containing as flameproofing agents a combination of a phenol-aldehyde resin and an alkali metal - or ammonium - polyphosphate.

11 Claims, No Drawings

FLAMEPROOF POLYAMIDE MOULDING COMPOSITIONS

This invention relates to reinforced and/or filled self-extinguishing polyamide moulding compositions containing combinations of phenolaldehyde resins and alkali metal and/or ammonium polyphosphates as flameproofing agents.

Combinations of halogen compounds and synergistically acting metal compounds respectively powder-form red phosphorus are widely used as flameproofing agents for glass-fibre-reinforced or mineral-filled polyamide moulding compositions. These flameproofing agents and their use are described, for example, in U.S. Pat. No. 3,418,267, in German Auslegeschrift No. 1,694,494=British Pat. No. 1,208,865, in German Offenlegungsschrift No. 2,544,219=U.S. Pat. No. 4,076,682 and in German Auslegeschrift No. 1,931,387=U.S. Pat. No. 3,778,407.

However, the use of halogen compounds as flameproofing agents has a number of disadvantages. For example, they drastically reduce the tracking resistance with the result that these products are of only limited use in the electrical sector. Another disadvantage is that moulding compositions containing halogen compounds can split off hydrogen halide in the processing machines at the high processing temperatures required, resulting in damage to the machines and in discoloration of the products. In addition, hydrogen halide is split off in the event of fire and can cause considerable corrosion in and around the location of the fire.

The main disadvantage of using red phosphorus as a flameproofing agent is that the powdered red phosphorus is difficult to handle because, in the presence of air, it shows a tendency towards dust explosions on coming into contact with hot metal surfaces under conditions of the kind generally encountered in the machines normally used for producing and processing the moulding compositions.

Another disadvantage is the evolution of toxic phosphorus-hydrogen compounds which always occurs in small quantities at the high temperatures used for processing the moulding compositions in spite of safety precautions of the type described, for example, in German Auslegeschrifts Nos. 2,308,104; 2,625,673 and 2,625,691.

Finally, the natural red colour of the phosphorus makes it difficult to produce moulding compositions with light colours. Concealing the red colour by means of white pigments results in deterioration of the mechanical properties.

German Offenlegungsschrift No. 2,359,700=British Pat. No. 1,473,598 describes the use of ammonium polyphosphate as a flameproofing agent for polyurethanes. For reinforced and filled polyamide moulding compositions, however, ammonium polyphosphate shows nearly no effectiveness.

For example, in the fire test according to Underwriters' Laboratories (UL), Subject 94, vertically arranged test specimens 1/16" and ⅛" thick of glass-fibre-reinforced polyamide-6,6 containing 5 and 15% by weight of ammonium phosphate burn away completely during the test.

It has now been found that alkali metal and/or ammonium polyphosphate in combination with phenolaldehyde resins have an excellent flameproofing effect on reinforced and/or filled polyamide moulding compositions, enabling them to comply with the requirements for Fire Classes VO according to UL.

This synergism is particularly surprising because the phenol-aldehyde resins themselves are readily inflammable, require a flameproof finish to reduce their inflammability and also have no significant effect on their own as flameproofing agents in polyamide moulding compositions.

Because all the components of the inventive flameproofing agent combination are substantially colourless or white, it is possible to obtain VO-rated (according to UL) polyamide moulding compositions in light colours which do not have any of the disadvantages referred to above.

Accordingly, the present invention relates to self-extinguishing moulding compositions comprising:

(1) from 40 to 95% by weight and preferably from 50 to 80% by weight of polyamide, (2) from 0.5 to 20% by weight and preferably from 2 to 15% by weight of alkali metal and/or ammonium polyphosphate, (3) from 0.5 to 20% by weight and preferably from 2 to 15% by weight of phenol-aldehyde resin, and (4) from 10 to 50% by weight and preferably from 15 to 35% by weight of reinforcing materials and/or fillers, the sum of components (1) to (4) having to amount to 100% by weight.

The flameproofing agent combinations according to the invention are preferably used for flameproofing aliphatic or partially aliphatic polyamides such as, for example, PA-6, PA-6,6, their mixtures, block polymers and copolymers of $\epsilon$-caprolactam, adipic acid, hexamethylene diamine, and also PA-11 and PA-12 and polyamides synthesised from aliphatic diamines and adipic acid and/or isophthalic acid and/or terephthalic acid and/or sebacic acid and/or azelaic acid and/or cyclohexane dicarboxylic acid.

In addition to hexamethylene diamine, suitable aliphatic diamines are 2,2,4- and 2,4,4-trimethyl hexamethylene diamine, isophorone diamine, 1,3- and 1,4-bis-aminocyclohexane, bis-aminocyclohexyl alkanes and xylylene diamine.

In addition, polyamides produced from the above-mentioned aliphatic dicarboxylic acids and aromatic diamines such as, for example, m- and p-phenylene diamine may also be flameproofed with the combinations according to the invention.

It is particularly preferred to make selfextinguishing polyamide-6 and polyamide 6,6 compositions.

The alkali metal and/or ammonium polyphosphates used according to the invention preferably correspond to the general formula:

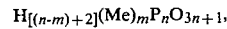

$$H_{[(n-m)+2]}(Me)_m P_n O_{3n+1},$$

in which n is an integer of from 3 to 1000 and preferably from 20 to 800 and the ratio of m to n amounts to approximately 1. Me preferably represents Li, Na, K or $NH_4$. It is particularly preferred to use ammonium polyphosphates having a degree of condensation (n) of from 400 to 800.

The alkali metal polyphosphates may be produced in accordance with G. Brauer, Handbuch der präaparativen anorganischen Chemie, 2nd Edition, pages 491 to 492.

Processes for producing ammonium polyphosphate are described in German Offenlegungsschrift No. 2,230,174.

The polyphosphates are formed by the elimination of water from orthophosphates.

Phenol-aldehyde resins used according to the invention preferably soften at temperatures in the range of from −30° to +350° C. and are preferably linear condensation products of phenols and formaldehyde and/or acetaldehyde.

Phenol-containing compounds from which the resins may be produced are inter alia phenol, n- and iso-alkyl phenols containing up to 8 carbon atoms in the side chains, naphthols, hydroxy diphenyls, hydroxy diphenyl ethers, pyrocatechol, resorcinol, hydroquinone, bis-(hydroxyphenyl)-alkanes and/or -cycloalkanes, bis-(hydroxyphenyl)-sulphides, bis-(hydroxyphenyl)-sulphones and hydroxybenzoic acids.

The phenol-aldehyde resins are produced by known methods of the type described for example in Houben-Weyl, Methoden der organischen Chemie, Vol. 14/2, 4th Edition, pages 273 et seq.

The molar ratio of aldehyde to the phenolic compound is generally in the range of from 0.3 to 1.2 and preferably in the range of from 0.5 to 0.9. It is preferred to use the novolaks obtained by acidic condensation.

In order to increase the melt viscosity, the phenol-aldehyde resin may be crosslinked with boric acid, phosphoric acid, phosphorous acid, esters of phosphorous and phosphoric acid, polybasic carboxylic acids, polyfunctional isocyanates, polyfunctional epoxides or $PCl_3$. Up to 25% by weight of crosslinking agent may be added to the resin. It is preferred to use polyfunctional epoxides, phosphoric acid and boric acid.

In addition, it may be advantageous to convert the phenol-aldehyde resins into metal salts because in this way the effectiveness of the flameproofing agent combination is generally improved. Metals suitable for salt formation include alkali and alkaline earth metals, zinc, cadmium, tin, lead, antimony, aluminium, copper, manganese, iron, cobalt and nickel. The resins may contain one or more of the metals. The metal salts may be produced, for example, from the phenol-aldehyde resins and the oxides, hydroxides, carbonates, acetates, formates, phosphates or borates of the metals. Up to 15% by weight of these metal compounds, preferably the oxides, may be added to the resins.

The phenol-aldehyde resins may also be grafted onto the polyamide component of the moulding compositions according to the invention providing the crosslinking agent (for example a diepoxide) has not yet reacted or has not completely reacted with the resin and is sufficiently reactive to be able to react with the polyamide during incorporation of the flameproofing agents.

The components of the flameproofing agent combination may be worked into the polyamides either separately or together. In addition, the components may be mixed before the incorporation in the polyamides.

The flameproofing agents are incorporated optionally together with the reinforcing materials and fillers, processing aids, pigments, dyes and stabilisers, preferably in standard twin-screw extruders. However, it is also possible to use single-screw extruders and kneaders.

The reinforcing materials and fillers present in the moulding compositions according to the invention include inter alia glass and asbestos fibres, glass beads, talcum, wollastonite, feldspars such as Microvit chalk and quartz.

Processing aids, pigments, dyes and stabilisers may be present in the moulding compositions in quantities of from 0 to 5% by weight. Such additives preferably are salts of stearic acid, carbon black, cadmium sulphide, phthalocyanines and sterically hindered phenols.

The moulding compositions according to the invention may be processed in standard injection moulding machines to form mouldings having excellent flameproof properties.

EXAMPLES

The ammonium polyphosphate used, having a degree of condensation n of 700, was Exolit ® 263, a product of Hoechst AG having the following particle size distribution:

| Particle diameter: | <70 μm | 100% |
|---|---|---|
| | <40 μm | 95% |
| | <10 μm | 80%. |

The sodium polyphosphate (a) used (n=16–72) was Madrell's salt produced in accordance with G. Brauer, Handbuch der präaparativen anorganischen Chemie, 2nd Edition, page 491. After grinding, the salt had the following particle size distribution:

| Particle diameter: | <70 μm | 100% |
|---|---|---|
| | <40 μm | 89% |
| | <20 μm | 74%. |

In addition, the sodium polyphosphate (b) (n=3–8) used was Calgon ®, a product of the Benckiser company, having the following particle size distribution:

| Particle diameter: | <70 μm | 100% |
|---|---|---|
| | <40 μm | 91% |
| | <20 μm | 78%. |

Phenol-aldehyde resins I–XII

The following resins were produced in accordance with Houben-Weyl, Methoden der organischen Chemie. Vol. 14/2, 4th Edition, Makromolekulare Stoffe II, pages 273 et seq:

A. Novolak of phenol and formaldehyde, softening range 113°–119° C., page 273.

B. Novolak of p-phenyl phenol and formaldehyde, softening range 87°–123° C., page 274.

C. Novolak of p-cresol and formaldehyde produced in accordance with method B but with 600 g of p-cresol instead of 945 g of p-phenyl phenol, softening range 78°–112° C.

D. Novolak of resorcinol and formaldehyde, softening range 98°–121° C., page 274.

E. Novolak of phenol and acetaldehyde, softening range 117°–122° C., page 275.

F. Resol of phenol and formaldehyde, a highly viscous resin at 20° C., page 278.

Table 1

| | | Crosslinking of the phenol-aldehyde resins and conversion into metal salts | | | |
|---|---|---|---|---|---|
| Resin | Addition | | % by weight | Reaction temp./°C. | Reaction time/h |
| I | A | diepoxide* | 5 | 230 | 5 |
| II | A | triethyl-phosphate | 3 | 180–230 | 5 |

Table 1-continued

Crosslinking of the phenol-aldehyde resins and conversion into metal salts

| Resin | | Addition | % by weight | Reaction temp./°C. | Reaction time/h |
|---|---|---|---|---|---|
| III | A | ZnO | 1.5 | 230 | 4 |
| IV | A | diepoxide* | 7 | 230 | 1 |
| | | ZnCO$_3$ | 0.5 | | |
| V | A | boric acid | 1.1 | 240 | 3 |
| VI | A | CaO | 1.3 | 250 | 3 |
| VII | B | FeCO$_3$ | 2 | 240 | 3 |
| VIII | C | diepoxide* | 3.5 | 230 | 5 |
| IX | C | H$_3$PO$_4$ | 0.5 | 210 | 2.5 |
| X | D | diepoxide* | 2.4 | 230 | 5 |
| XI | E | diepoxide* | 4 | 230 | 5 |
| XII | F | tolylene diisocyanate | 3 | 200 | 1 |

*diglycidyl ether of 2,2-bis-(4-hydroxyphenyl)-propane (bisphenol A)

As shown in Table 1, resins A to F were crosslinked or converted into metal salts. After the resins had been poured out onto metal plates, they hardened quickly into brittle products which could readily be ground to particle diameters of from 2 to 4 μm.

EXAMPLES 1-18

The phenol-aldehyde resins and the polyphosphate were worked into the polyamides, optionally together with fillers, reinforcing materials, pigments and auxiliaries, in a Reifenhäuser single-screw extruder having a screw diameter D of 30 mm and a screw length of 20 D.

The composition, incorporation conditions and burning properties of the mixtures are shown in Table 2.

For testing the burning properties of the moulding compositions in accordance with UL, Subject 94, ASTM test bars measuring approximately 1.5×12.5×127.5 mm and 3×12.5×127.5 mm were produced by injection moulding.

The relative solution viscosity ($\eta_{rel}$) of the polyamides was measured in a 1% solution in m-cresol at 25° C.

Table 2 composition, production conditions and burning properties of the polyamide moulding compositions

| | Example No. | Polyamide/ $\eta_{rel}$ | % by weight in the mixture | Ammonium polyphosphate % by weight |
|---|---|---|---|---|
| comparison examples | 1 | PA-6,6 with 35% by weight of glass fibres/3.07 | 95 | 5 |
| | 2 | PA-6,6 with 35% by weight of glass fibres/3.07 | 85 | 15 |
| | 3 | PA-6,6 with 35% by weight of glass fibres/3.07 | 82 | — |
| | 4 | PA-6,6 with 35% by weight of glass fibres/3.07 | 82 | — |
| | 5 | PA-6,6 with 35% by weight of glass fibres/3.07 | 82 | 12 |
| | 6 | PA-6,6 with 35% by weight of glass fibres/3.07 | 80 | 10 |
| | 7 | PA-6,6 with 35% by weight of glass fibres/3.07 | 82 | 12 |
| | 8 | PA-6/2.97 | 62 | 12 |
| | 9 | PA-6/2.97 | 60 | 12 |
| | 10 | PA-6/2.97 | 62 | 12 |
| | 11 | 50%/50% mixture of PA-6/2.97 and PA-6,6/3.07 | 62 | 12 |
| | 12 | 50%/50% mixture of PA-6/2.97 and PA-6,6/3.07 | 60 | 12 |
| | 13 | 50%/50% mixture of PA-6/2.97 and PA-6,6/.07 | 62 | 10 |
| | 14 | 50%/50% mixture of PA-6/2.97 and PA-6,6/307 | 70 | 12 |
| | 15 | PA of isophthalic acid and hexamethylene diamine/ 2.64 | 60 | 14 |
| | 16 | PA of isophthalic acid and hexamethylene diamine/ 2.64 | 60 | 12 |
| | 17 | PA of isophthalic acid and hexamethylene diamine/ 2.64 | 60 | sodium polyphosphate (a)/12 |
| | 18 | PA of isophthalic acid and hexa- | 60 | sodium polyphosphate (b)/12 |

Table 2-continued composition, production conditions and burning properties of the polyamide moulding compositions methylene diamine/ 2.64

| | Example No. | Phenol-aldehyde resin/% by weight | Other Additives % by weight | Melt temp. °C. | Burning properties according to UL, Subject 94, Test bar thickness | |
|---|---|---|---|---|---|---|
| | | | | | 1.5 mm | mm |
| comparison examples | 1 | — | — | 280 | burns away | burns away |
| | 2 | | — | 280 | burns away | burns away |
| | 3 | A/18 | — | 270 | burns away | burns away |
| | 4 | I/18 | — | 270 | burns away | burns away |
| | 5 | I/6 | — | 280 | V0 | V0 |
| | 6 | II/10 | — | 270 | V0 | V0 |
| | 7 | III/6 | — | 280 | V1 | V0 |
| | 8 | IV/6 | short glass fibres/20 | 270 | V1 | V1 |
| | 9 | V/8 | short glass fibres/20 | 270 | V1 | V0 |
| | 10 | VI/6 | short glass fibres/20 | 270 | V1 | V0 |
| | 11 | VII/6 | short glass fibres/20 | 280 | V1 | V0 |
| | 12 | VIII/8 | short glass fibres/20 | 280 | V1 | V0 |
| | 13 | IX/8 | wollastonite/20 | 290 | V1 | V0 |
| | 14 | X/8 | talcum/10 | 280 | V1 | V0 |
| | 15 | XI/8 | chalk/10 | 265 | V1 | V1 |
| | 16 | XII/8 | wollastonite/20 | 265 | V0 | V0 |
| | 17 | I/8 | wollastonite/20 | 270 | V1 | V1 |
| | 18 | I/8 | wollastonite/20 | 270 | V1 | V1 |

We claim:

1. A self-extinguishing thermoplastic moulding composition comprising
   (1) from 40 to 95% by weight of polyamides,
   (2) from 0.5 to 20% by weight of an alkali metal and/or ammonium polyphosphate,
   (3) from 0.5 to 20% by weight of a phenol-aldehyde resin,
   (4) from 10 to 50% by weight of a reinforcing material and/or filler,
the sum of components (1) to (4) having to amount to 100% by weight.

2. A moulding composition as claimed in claim 1, containing from 50 to 80% by weight of component (1).

3. A moulding composition as claimed in claim 1, containing from 2 to 15% by weight of component (2).

4. A moulding composition as claimed in claim 1 containing from 2 to 15% by weight of component (3).

5. A moulding composition as claimed in claim 1 containing from 15 to 35% by weight of component (4).

6. A moulding composition as claimed in claim 1, wherein the phenol-aldehyde resin contains up to 25% by weight of a crosslinking agent.

7. A moulding composition as claimed in claim 1 wherein the phenol-aldehyde resin is in the form of a metal salt.

8. A moulding composition as claimed in claim 1, wherein the polyamide is polyamide-6 or polyamide 6,6.

9. A moulding composition as claimed in claim 1 wherein the reinforcing materials are glass or asbestos fibres or glass beads.

10. A moulding composition as claimed in claim 1 wherein the fillers are talcum, wallastonite, feldspars, chalk or quartz.

11. A moulding composition as claimed in claim 1, wherein the polyphosphate corresponds to the general formula

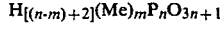

wherein n is an integer of from 3 to 1000 the ratio of m to n amounts approximately to 1, Me is Li, Na, K or NH$_4$.

* * * * *